July 17, 1951     G. W. SCHATZMAN     2,560,601
FENDER AND FENDER SHIELD CONSTRUCTION
Filed Sept. 23, 1946     2 Sheets-Sheet 1
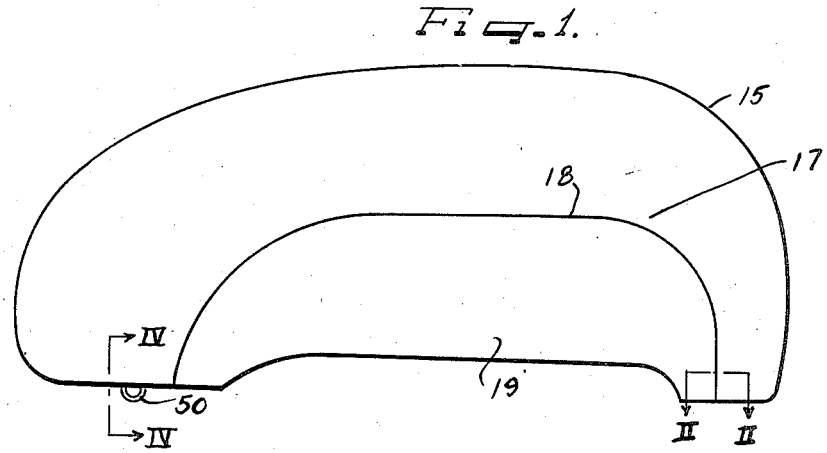
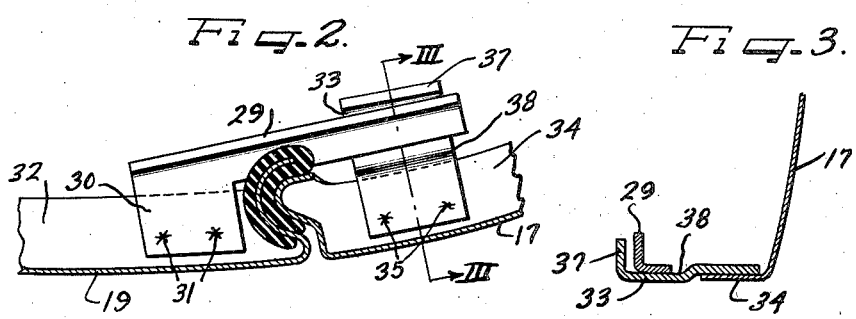
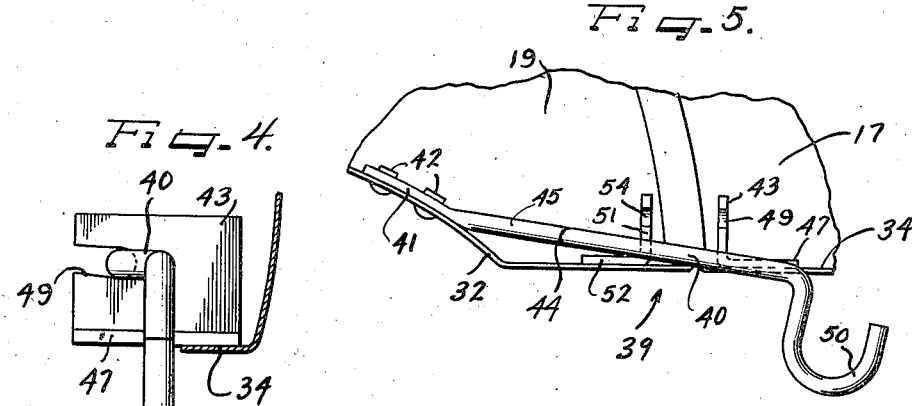
Inventor
GEORGE W. SCHATZMAN

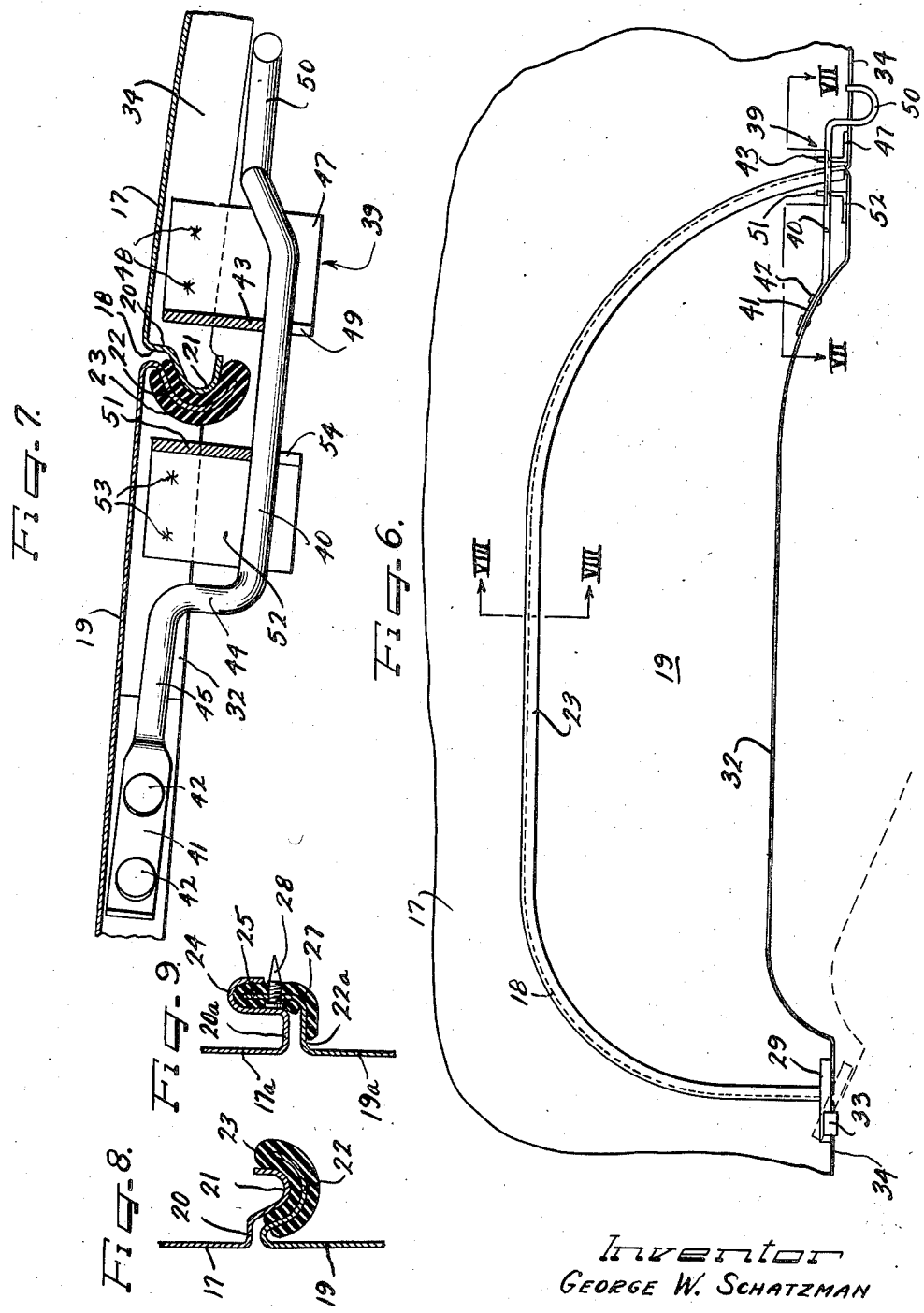

Patented July 17, 1951

2,560,601

UNITED STATES PATENT OFFICE 2,560,601

FENDER AND FENDER SHIELD CONSTRUCTION

George W. Schatzman, Detroit, Mich., assignor to Houdaille-Hershey Corporation, Detroit, Mich., a corporation of Michigan Application September 23, 1946, Serial No. 698,778

9 Claims. (Cl. 280—153)

This invention relates to fender and fender shield constructions, and more particularly to novel means for mounting and securing fender shields to the fenders.

In the vehicle industry, and particularly in the automobile industry, various means have been utilized to improve the appearance of vehicle fenders. Usually a fender is provided with an opening which affords access to the vehicle wheel, and which permits the ready removal or replacement of the wheel in an axial direction. Since this opening inherently presents an unattractive outward appearance, detachable fender shields have been employed substantially to cover the opening.

As the term "fender shields" shall hereinafter be employed, it refers to any member which is adapted to be secured to a fender or other portion of a vehicle body for the purpose of covering the opening in the fender or vehicle body which is provided for access to or removal of a vehicle wheel. Furthermore, as the term "fender" shall hereinafter be employed, it refers to any form of wheel fender in its broad sense, whether such fender be separated from the vehicle body part, partly separated from the vehicle body part, or actually an integral part of the vehicle body, and whether or not it projects outwardly away from the principal body portion of the vehicle.

An important object of the present invention is to provide a novel fender and fender shield construction in which the fender shield is mounted upon and secured to the fender in a novel manner.

Another object of the invention is to provide a novel fender shield construction which is economical to manufacture, which is rugged and reliable in use, and in which the fender shield may be readily and quickly attached to and detached from the vehicle fender.

Another object of the invention is to provide a fender shield having novel means for securing it in place removably upon a fender.

A further object of the invention is to provide unusually simple and inexpensive means for securing a fender shield in closing relation to the wheel access opening of a vehicle fender.

Still another object of the invention is to provide improved means for mounting a vehicle fender shield in flush arrangement with respect to the outer wall of the associated vehicle fender.

It is also an object of the invention to provide novel means for mounting a fender shield interlockingly with the fender by a simple assembly movement in the plane of the fender wall having the access opening therein.

Yet another object of the invention is to provide novel means for securing a fender shield detachably to a fender and which is adapted for simple and easy attachment or detachment of the fender shield but is nevertheless positive and reliable in action.

Other objects, features and advantages of the present invention will become readily apparent from the following detailed description of certain preferred embodiments thereof taken in conjunction with the accompanying two sheets of drawings in which:

Figure 1 is an elevational view of a fender and fender shield assembly embodying the features of the present invention;

Figure 2 is an enlarged fragmentary sectional detail view taken substantially along the line II—II of Figure 1;

Figure 3 is a vertical sectional detail view taken substantially along the line III—III of Figure 2;

Figure 4 is an enlarged fragmentary sectional detail view taken substantially along the line IV—IV of Figure 1;

Figure 5 is a fragmentary inside elevational view of substantially that portion of the fender shield assembly shown in Figure 4;

Figure 6 is a fragmentary inside elevational view of the fender shield and contiguous portion of the fender on a somewhat enlarged scale;

Figure 7 is a substantially enlarged sectional detail view along substantially the line VII—VII of Figure 6;

Figure 8 is a fragmentary vertical sectional detail view on an enlarged scale taken in substantially the plane of line VIII—VIII of Figure 6; and Figure 9 is a fragmentary vertical sectional detail view showing a modified form of fender and fender shield interconnecting flange structure.

Having more particular reference to the drawings, a fender 15, which may be of the popular high crown type, has an outer wall 17 formed with a wheel access opening 18 adapted to be ornamentally closed by a fender shield 19.

By preference, the construction and interrelationship of the fender shield 19 with respect to the fender wall 17 is such that the fender shield 19 when assembled with the fender lies substantially flush with the exterior of the fender wall 17. To this end the fender 15 is provided around the opening 18 with an inwardly extending reinforcing flange 20 having, inset inwardly a substantial distance from the fender wall 17, a return bent preferably rounded flange portion 21 which projects uniformly into the opening 18. This provides, in effect, a bead with which a complementary inturned reinforcing and interlocking flange 22 on the opposing margin of the fender shield 19 is adapted to engage in internested interlocking relationship to hold the fender shield against lateral displacement relative to the fender. As best seen in Figures 2, 7 and 8, the interlocking flange 22 is formed on a radius which while substantially complementary to the fender flange 20 is slightly larger than the bead portion 21 of the fender flange for the internested reception therebetween of a cushioning gasket 23 which is made from resilient material such as rubber or the like. By preference, the gasket 23 is formed of curvate cross-section complementary to the interlocking flanges 21 and 22 and of a doubled over structure to be self-retaining on the flange 22. The gasket 23 may, of course, be adhesively or otherwise secured to the fender shield flange 22.

Assembly of the fender shield 19 in closing relation within the fender opening 18 is adapted to be accomplished by moving the fender shield 19 upwardly in a common plane with the fender wall 17 until the bead 21 of the fender flange internestingly engages within the interlocking flange 22, with the resilient gasket 23 interposed therebetween and maintaining the assembly rattle-proof.

An alternative or optional form of interlocking flange and gasket construction is shown in the modification of Figure 9. Therein, the fender wall identified at 17a is formed with a reinforcing flange 20a having a reentrant inner marginal formation 24 which provides an outwardly or downwardly opening groove for interlocking reception of an outwardly or upwardly extending marginal flange portion 25 on the inturned reinforcing flange 22a of the fender shield 19a. The interlocking flange portion 25 is clad in a rattle-proof gasket 27 which may be formed from rubber or other suitable resilient gasket material folded about the flange 22a and the interlocking marginal flange portion 25 and preferably secured against dislodgment by suitable means such as screw nails 28 driven through the folds of the gasket 27 and the interposed marginal interlocking flange 25. In this form of the retaining flange structure, the gasket-clad marginal flange 25 of the fender shield enters interlockingly into the groove of the flange portion 24 of the fender upon upward movement of the fender shield 19a in the plane of the fender wall 17a, the assembly providing a flush exterior appearance of the fender and fender shield.

Means for holding the fender shield 19 against unintentional dropping out of the assembled relationship with the fender 15 herein, in the preferred form, comprises structure provided at the opposite ends of the fender shield 19 cooperatively related to retaining structure on the fender 15. To this end, the fender shield 19 is equipped at one end with a supporting arm 29 which for the sake of rigidity is preferably of angle shaped cross-section. The arm 29 has a lateral attaching flange at its fender shield end secured as by spot welding 31 to the upper face of an inwardly extending horizontal reinforcing flange 32 along the lower edge of the fender shield 19. The arm 29 extends substantially beyond the end of the fender shield and is adapted to engage upon a bracket 33 carried by an inwardly extending horizontal reinforcing flange 34 along the lower edge of the fender wall 17. The supporting bracket 33 may be simply in the form of a metal plate having its outer or fender flange margin secured as by spot welding 35 to the fender flange 34 and having its inner or free margin turned up into a retaining flange 37. The portion of the bracket 33 adjacent to the retaining flange 37 which is engaged by the supporting arm 29 is preferably offset downwardly as shown at 38 (Figure 3) so that the upper surface thereof which is engaged by the arm 29 is flush with the upper face of the flange 34.

In assembling the fender shield 19 with the fender, the supporting arm 29 is engaged upon the supporting bracket 33 substantially as indicated in broken outline in Figure 6, with the adjacent portions of the internesting flanges 20 and 22 of the fender and fender shield, respectively, in position for registration. The fender shield is then swung up, about a fulcrum axis provided by the bracket 33 until the retaining flanges are in full nested registration, the relationship of the supporting arm 29 to the supporting bracket 33 being such that in the fully internested relation of the retaining flanges, the internested relationship is maintained fairly snugly as long as the opposite end of the fender 19 is also maintained in such condition.

Means for so maintaining said opposite end of the fender shield 19 comprises latching and tensioning mechanism generally identified at 39. The principal component of the latching and tensioning mechanism comprises a latching and tensioning member 40 which is carried by the fender shield and is preferably in the form of a resilient lever such as a rod formed at one end and with a flattened elongated attachment terminal portion 41 by which it is secured as by means of rivets 42 to the horizontal reinforcement flange 32 of the fender shield. In the present instance, the attaching terminal 41 is secured to a sloping section of the flange 32 but could just as well be secured to a straight horizontal portion of such flange, it being obvious that a simple offset conformation of adjacent portions of the latching and tensioning rod 40 would be in order to accommodate such change.

In the non-latching position of the latching and tensioning rod 40, it is resiliently biased to extend in a generally downward and endwise direction relative to the fender shield, as indicated in Figure 5, where in it substantially intersects the lower adjacent corner of the fender shield. From this non-latching position, the latching and tensioning rod 40 is adapted to be flexed upwardly into substantially parallel relation to the reinforcing flange 34 of the fender into interlocking relation with a keeper 43 mounted on the fender flange 34. Flexing of the latching and tensioning rod 40 is adapted to take place locally adjacent to the juncture of the attaching terminal portion 41 in the body of the rod, while a minimum of flexing occurs in the remainder of the rod. Localizing of flexure is implemented by a substantially right angular offsetting bend 44 formed far enough removed longitudinally from the flat attaching portion 41 to afford an adequate flexure section 45 in the rod and of ample extent to clear the main portion of the rod inwardly from the interlocking flanges 20 and 22. From the bend 44 the rod 40 extends in its general axis for engagement with the keeper 43.

In a preferred construction, the keeper 43 comprises simply an angular plate the main panel or keeper portion of which extends upright normal to the plane of the fender wall 17, while a foot flange 47 is secured to the fender flange 34 as by means of spot welding 48.

In the present instance, the keeper 43 is mounted to intersect the axis of the latching and tensioning rod 40 and has a generally horizontal but slightly downwardly angled keeper slot 49 (Figure 4) formed at its inner edge and receptive of the body of the rod 40 when the latter is flexed upwardly, the resilient flexibility of the rod casuing it to snap into the keeper slot 49 as it registers therewith. As a result of the upward deflection of the latching and tensioning rod 40 for latching engagement with the keeper 43, a substantial upward resilient bias develops in the plane of the fender shield 19 as a reaction. This drives the fender shield in its plane upwardly to urge the interlocking flange 22 of the fender shield into firm retaining relation to the bead portion 21 of the fender opening flange 20. Likewise, the resilient connteraction generated in the rod 40 by the latching deflection thereof causes it to drive tightly into the latching slot 49 wherein it is effectively retained until the rod is intentionally flexed out of the slot.

Means to facilitate manipulating the latching and tensioning rod 40 preferably comprises an integral downwardly extending handle loop 50 which, as shown in Figures 1 and 6, may be accessible from the outside of the fender below the reinforcing flange 34.

In order to lock the latching and tensioning rod 40 against vertical deflection due to the weight of the fender shield supported thereby after latching interengagement with the keeper 43, a supplementary interlock bracket 51 is mounted on the fender shield reinforcing flange 32 adjacent to the corner of the fender shield and interengageable with the latching rod 40 substantially coincident with latching engagement with the keeper. By preference, the locking bracket 51 may be a substantial counterpart of the keeper 43, comprising an angle member having a horizontal flange 52 secured as by means of spot welding 53 (Figure 7) to the flange 32 and having a retaining slot 54 to receive the body of the rod 40 therein. Thus, when the latching and tensioning rod 40 is secured within the slots 49 and 54 of the keeper and the locking bracket, respectively, it is supported fairly rigidly against vertical deflection due to the weight of the fender shield 19, such as might cause the rod to be placed under undue deflection or strain especially during the service of the associated vehicle when it is subjected to up and down jarring or jolting.

From the foregoing it will be apparent that the fender shield of the present invention is adapted to be mounted and removed with great ease and facility. Mounting of the fender shield is a simple unidirectional movement effected by pivoting the fender shield up in the plane of the fender wall 17 about the fulcrum provided by the supporting bracket 33 upon which the supporting arm 29 rests. When the fender shield is in the assembled position within the wheel opening 18, a continuing upward movement of the free end of the tensioning and latching lever 40 by pushing up on the handle 50 causes the lever to find and snap into the aligned keeper and locking notches 49 and 54 of the keeper and locking member, respectively.

Removal of the fender shield is accomplished by pushing inwardly on the handle 50 of the latching and tensioning lever 40 until the body of the lever is forced beyond the mouth of the slot 49 and possibly, though not necessarily, the slot 54, whereupon the normal resilient bias of the lever causes it to tend to swing down clear of the keeper 43. Then the fender shield can be removed by simply allowing it to drop down until the interlocking marginal flanges on the fenders and fender shields have cleared from their interlocking nested relationship, whereupon the supporting arm 29 can be withdrawn from the bracket 33 by lifting the arm over the bracket flange 37 or sliding it longitudinally from the bracket.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In combination in a fender and fender shield assembly, means for maintaining the fender and fender shield against lateral displacement, and means for maintaining the fender and fender shield against planar displacement comprising supporting means at the opposite ends of the fender shield including an elongated latching and tensioning rod secured to the fender shield and extending beyond one end thereof, said rod normally extending in a downward direction and being adapted to be flexed upwardly toward a horizontal position, a keeper mounted upon the fender adjacent to such end of the fender shield and engageable with the rod after upward flexure thereof to maintain the same in latching and tensioned position, and anti-deflection locking structure on the fender shield adjacent to said end and engageable with the rod in its upwardly flexed latching and tensioned position.

2. In combination in a fender and fender shield assembly, means for maintaining the fender and fender shield against lateral displacement, and means for maintaining the fender and fender shield against planar displacement comprising supporting means at the opposite ends of the fender shield including an elongated latching and tensioning lever secured to the fender shield and extending beyond one end thereof, said lever normally extending in a downward direction and being adapted to be flexed upwardly toward a horizontal position, a keeper mounted upon the fender adjacent to such end of the fender shield and engageable with the lever after upward flexure thereof to maintain the same in latching and tensioned position, and anti-deflection locking structure on the fender shield adjacent to said end and engageable with the lever in its latching and tensioned position, said keeper and said locking structure being substantial counterparts in construction and coincidentally engageable with the lever in its upwardly flexed position.

3. In combination in a fender and fender shield assembly, the fender having a wheel access opening and the fender shield being adapted to afford a closure for said opening, the fender and fender shield having a complementary marginal structure at said opening interengageable upon an upward assembly movement of the fender shield in the plane of the vertical wall of the fender within said opening, and means at the opposite ends of the fender shield for securing the fender shield against downward displacement from the opening, the means at one end of the fender shield comprising an elongated torsion latch having one end portion thereof fixedly secured to the fender shield spaced inwardly from the proximate end of the fender shield and normally extending in a downwardly oblique direction past said proximate end of the fender shield and substantially therebeyond, the fender having an inwardly extending lower marginal flange, and an engagement element mounted on said flange and extending inwardly therefrom, said engagement element including a portion having a retaining slot therein arranged to be engaged by upward flexing of the torsion latch member and manipulation of the latch member into the slot after the fender shield has been brought into substantially full assembly within said wheel opening and is held by engagement with the fender against further upward movement so that upward force applied to the free end portion of said torsion latch member causes the same to flex intermediately upwardly and thus place the fender shield under upward retaining tension sustained by engagement of the torsion latch member with said slotted portion of the engagement element on the fender.

4. In combination in a fender and fender shield assembly, the fender shield being of the type adapted to be assembled with the fender within the wheel access opening in the latter by upward movement generally in the plane of the fender shield, means for securing the opposite ends of the fender shield in assembled relation comprising a torsion rod latch anchored at one end to the fender shield in spaced relation to an end of the fender shield and projecting endwise of the fender shield beyond said end of the fender and with a normal resilient bias downwardly, and a keeper member mounted on the inner side of the fender adjacent said end of the fender shield and including an upstanding lug having an inwardly opening slot receptive of the torsion rod latch upon upward flexing of the latter and inserted in said slot after the fender shield has been assembled within the wheel opening, whereby to retain the latch in the flexed, fender shield retaining position.

5. In combination in a fender and fender shield assembly, the fender shield being of the type adapted to be assembled with the fender within the wheel access opening in the latter by upward movement generally in the plane of the fender shield, means for securing the opposite ends of the fender shield in assembled relation comprising a torsion lever latch anchored at one end to the fender shield in spaced relation to said end of the fender shield and projecting endwise of the fender shield beyond said end of the fender shield and with a normal resilient bias downwardly, a keeper member mounted on the inner side of the fender adjacent said end of the fender shield and including an inwardly projecting lug receptive of the torsion lever latch upon upward and outward flexing of the latter after the fender shield has been assembled within the wheel opening, whereby to retain the latch in the flexed, fender shield retaining position, and anti-deflection means on the fender shield engaging with the latch lever coincident with engagement of the latch with the keeper lug, the movable extremity of the torsion lever latch comprising a loop formation engageable for manipulation of the latch lever.

6. In combination in a fender and fender shield assembly, the fender shield being of the type adapted to be assembled with the fender within the wheel access opening in the latter by upward movement generally in the plane of the fender shield, means for securing the opposite ends of the fender shield in assembled relation comprising a torsion rod latch anchored at one end to the fender shield in spaced relation to said end of the fender shield and projecting endwise of the fender shield beyond said end of the fender shield and with a normal resilient bias downwardly, and a keeper member mounted on the inner side of the fender adjacent said end of the fender shield and including an upstanding lug having an inwardly opening slot receptive of the torsion rod latch upon upward flexing of the latter and insertion into the slot after the fender shield has been assembled within the wheel opening, whereby to retain the latch in the flexed, fender shield retaining position, said slot having a forwardly downwardly slanting lower edge whereby to resist unintentional escape of the torsion rod latch therefrom.

7. In combination in a fender and fender shield assembly wherein the fender shield is mounted on the fender by an upward movement, means for retaining the opposite ends of the fender shield assembled with the fender comprising a torsion latch anchored at one end to the fender shield and extending endwise beyond one end of the fender shield in a downwardly resiliently biased direction, the fender having a latch member thereon provided with an inwardly opening retaining slot within which the torsion latch is engaged after assembly of the fender shield with the fender and upward flexing of the torsion latch, and an anti-deflection member substantially counterpart of the retaining member but mounted on the fender shield adjacent to the edge of said one end of the fender shield and engageable with the torsion latch substantially coincident with engagement of the torsion latch with the retaining member on the fender.

8. In combination in a fender and fender shield assembly, a fender having a wheel access opening defined by an inwardly extending reinforcing flange including a horizontal portion and an inner terminal upwardly projecting downwardly opening hook-like portion, a fender shield for closing said access opening and having a marginal inturned reinforcing flange including an outer horizontal portion and an inner angular upwardly extending portion, and a sealing gasket embracing said upwardly extending portion of the fender shield flange and with the upwardly extending fender shield flange in said hook-like fender flange portion snugly engaging within said hook-like portion to hold the fender shield against transverse displacement and against rattling.

9. In combination in a fender and fender shield assembly, a fender having a wheel access opening and having a generally inwardly extending flange on its lower margin at one side of said access opening, a fender shield for closing said wheel access opening and having a lower marginal generally inturned flange, cooperating inturned flanges on the fender and fender shield within said wheel access opening, means at one end of the fender shield for supporting the fender shield in the assembly, an inwardly projecting generally L-shaped bracket member having the long leg thereof secured to said lower marginal fender flange adjacent to the opposite end of the wheel access opening and projecting inwardly beyond said fender flange with the short leg thereof projecting upwardly at its inner extremity, the length of the long leg of said member being greater than the inward projection of the adjacent portions of the flanges of the fender and fender shield at said opposite end of the wheel access opening, and an attachment bracket member including a body portion secured to the lower marginal flange of the fender shield adjacent said opposite end and projecting inwardly therefrom, said last mentioned bracket member having a rigid finger extending beyond said opposite end of the fender shield past said flanges of the fender and fender shield at said one end of the wheel access opening and engaging upon the long leg of the bracket member on the fender between the upstanding short leg thereof and the fender and thereby supporting said opposite end of the fender shield in place on the fender.

GEORGE W. SCHATZMAN.

REFERENCES CITED

The following references are of record in the file of this patent:

UNITED STATES PATENTS

| Number | Name | Date |
|---|---|---|
| 1,907,790 | Graham | May 9, 1933 |
| 1,995,774 | Moore | Mar. 26, 1935 |
| 2,048,862 | Haltenberger | July 28, 1936 |
| 2,081,231 | Grimshaw | May 25, 1937 |
| 2,222,619 | Jandus | Nov. 26, 1940 |
| 2,222,625 | Mills | Nov. 26, 1940 |
| 2,239,373 | Schatzman et al. | Apr. 22, 1941 |
| 2,267,421 | Purdy | Dec. 23, 1941 |